United States Patent [19]

Silverberg

[11] 4,284,270
[45] Aug. 18, 1981

[54] STACK FOR BOTTOM SHEET FEEDER
[75] Inventor: Morton Silverberg, Rochester, N.Y.
[73] Assignee: Xerox Corporation, Stamford, Conn.
[21] Appl. No.: 81,596
[22] Filed: Oct. 3, 1979
[51] Int. Cl.³ .......................... B65H 1/24; B65H 3/12
[52] U.S. Cl. ..................................... 271/166; 271/98; 271/99; 271/106
[58] Field of Search .................. 271/3.1, 5, 11, 20, 271/35, 90, 94, 98, 99, 104–106, 112, 132, 133, 161, 165–167, 276

[56] References Cited
U.S. PATENT DOCUMENTS

| | | | |
|---|---|---|---|
| 2,817,519 | 12/1957 | Beck | 271/94 |
| 3,424,453 | 1/1969 | Halbert | 271/35 |
| 3,844,551 | 10/1974 | Morrison | 271/106 X |
| 3,973,768 | 8/1976 | Shannon | 271/99 |

FOREIGN PATENT DOCUMENTS 435327 10/1967 Switzerland ..................... 271/99

Primary Examiner—Robert W. Saifer

[57] ABSTRACT

An automatic document handler adapted to receive a stack of documents to be copied for feeding the documents seriatim to the platen of a copy machine and returning the copied documents to the stack. A combination vacuum-document separator in conjunction with an air knife and a document tray having a "U" shaped pocket therein is provided to assure positive feeding of each document to the platen without misfeeds or multifeeds.

4 Claims, 4 Drawing Figures

STACK FOR BOTTOM SHEET FEEDER

BACKGROUND OF THE INVENTION

With the advent of high speed xerographic copy reproduction machines wherein copies can be produced at a rate in excess of three thousand copies per hour, the need for a document handler to feed documents to the copy platen of the machine in a rapid, dependable matter was recognized to enable full utilization of the reproduction machines potential copy output. A number of document handlers are currently available to fill that need. These document handlers must operate flawlessly to virtually eliminate the risk of damaging the originals and generate minimum machine shutdowns due to uncorrectable misfeeds or document multifeeds. It is in the initial separation of the individual documents from the document stack where the greatest number of problems occur.

Since the documents must be handled gently but positively to assure separation without damage through a number of cycles, a number of separators have been suggested such as friction rolls or belts used for fairly positive document feeding in conjunction with a retard belt, pad, or roll to prevent multifeeds. Vacuum separators such as sniffer tubes, rocker type vacuum rolls, or vacuum feed belts have also been utilized.

While the friction roll-retard systems are very positive, the action of the retard member, if it acts upon the printed face can cause smearing or partial erasure of the printed material on the document. With single sided documents, this does not present a problem as the separator can be designed so that the retard mechanism acts upon the underside of the document. However, with documents printed on both sides, there is no way to avoid the problem. Additionally, the reliable operation of friction retard feeders are highly dependent on the relative frictional properties of the paper being handled. This cannot be controlled in a document feeder.

It is therefore the object of this invention to provide an improved vacuum feeder which consistantly feeds sheets in a positive yet gentle manner without multifeeds.

SUMMARY OF THE INVENTION

A sheet feeder for separating and feeding the bottom sheet in a sheet stack including a plurality of vacuum feed belts spaced from the bottom surface of the document stack, the sheet stack being supported on a stack tray having "U" shaped pocket formed therein, the vacuum from the feed belts causing a portion of the bottom sheet in the stack to be pulled into the pocket for contact with the vacuum feed belts.

DESCRIPTION OF THE PREFERRED EMBODIMENT

Figure 1:
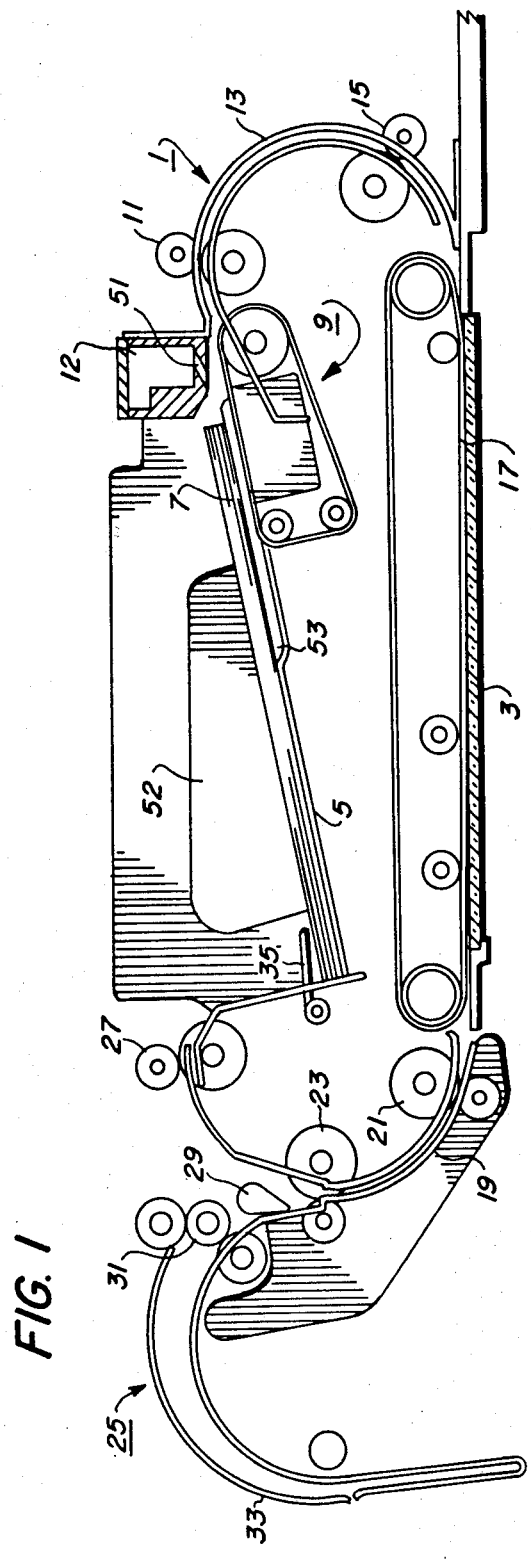
FIG. 1 is a cross-sectional view of an exemplary document handler employing the sheet separator-feeder of the present invention.

Referring to the drawings, there is illustrated an automatic document handler 1 for installation above the exposure platen 3 of a xerographic reproduction machine. The document handler is provided with a document tray 5 to be explained more fully hereinafter, adapted for supporting a stack of documents 7 face up. A vacuum belt-corrugating feeder mechanism 9 is located below the document tray for acquiring and corrugating the bottom document in the stack and forwarding the document to take away roll pair 11 after an air knife 12 has had time to separate sheet one from the rest of the stack. The document is then fed by take-away roll pair 11 through document guide 13 to feed-roll pair 15 and under platen belt 17 onto the platen of the copy machine for reproduction. After exposure of the document, it is fed off the platen by belt 17 into guide 19 and feed-roll pairs 21 and 23 either to an inverter mechanism 25 or back to the document stack through the feed-roll pair 27. A diverter 29 is provided to divert the document either to the inverter or to the feed-roll pair 27. The inverter comprises a three roll arrangement 31 and a closed inverter pocket 33. If the document is to be inverted it is fed through the lower two rolls of the three roll inverter into the pocket. When the trail edge of the document clears the nip of the lower two rolls in the three roll inverter, the stiffness of the sheet will cause the trail edge to straighten up into the nip of the upper two rolls of the inverter at which time it will be fed into roll pair 27 and back into the document stack. The inverter pocket illustrated is sized such that when the leading edge of the document contacts the end of the pocket, the document will buckle slightly within the upper portion of the pocket 33, the buckle thereby providing the required force to feed the trailing edge of the document into the upper roll pair of the inverter rolls for feeding the sheet toward roll pair 27. If desired, an open ended inverter pocket could be utilized having a feed roll pair associated therewith for feeding the document back into the upper roll pair in a positive manner rather than relying on the sheet buckle to feed the document thereto.

The document handler is also provided with a sheet separator finger 35 as is well known in the art to separate the documents to be fed from those documents returned to the document handler. Upon removal of the last document from beneath sheet separator finger 35, the finger 35 drops through a slot provided in the tray, suitable sensors are provided to sense that the last document in the set has been removed from the tray and the finger is then rotated in a clockwise direction to again come to rest on the top of the documents in the stack prior to subsequent recirculation of the document set.

Figure 2:
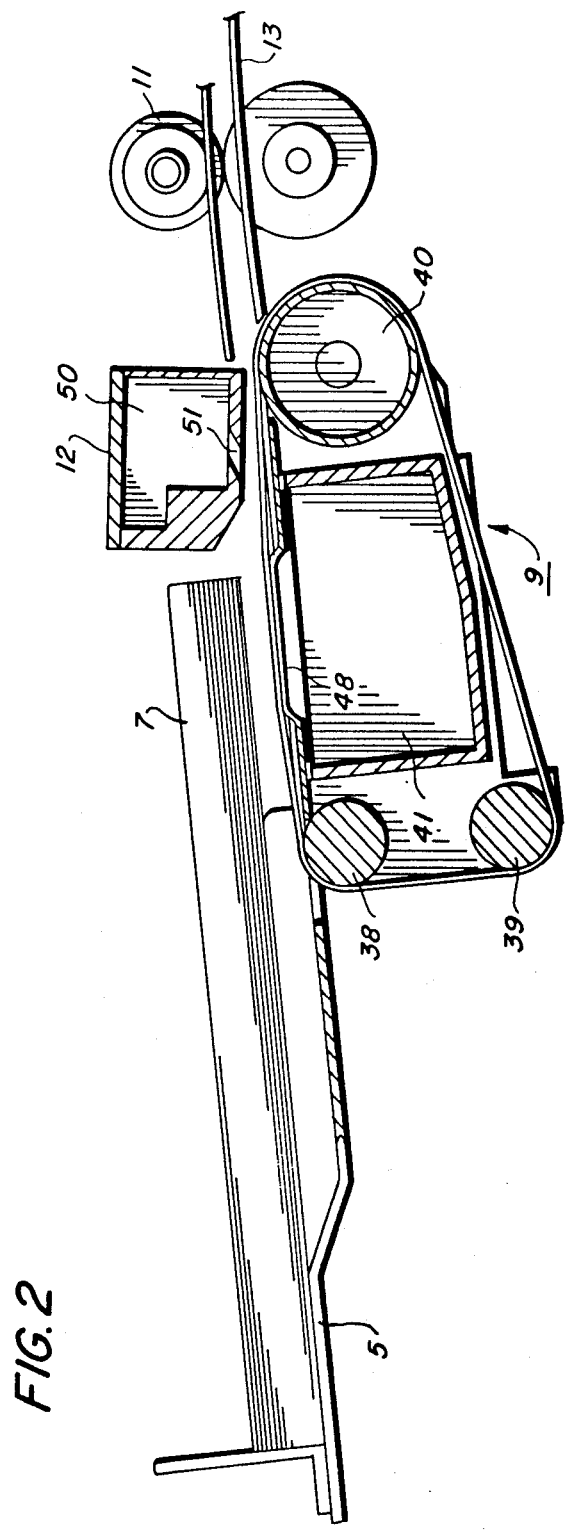
FIG. 2 is an enlarged, cross-sectional view of the separator-feeder portion of the document handler of FIG. 1.
Figure 3:
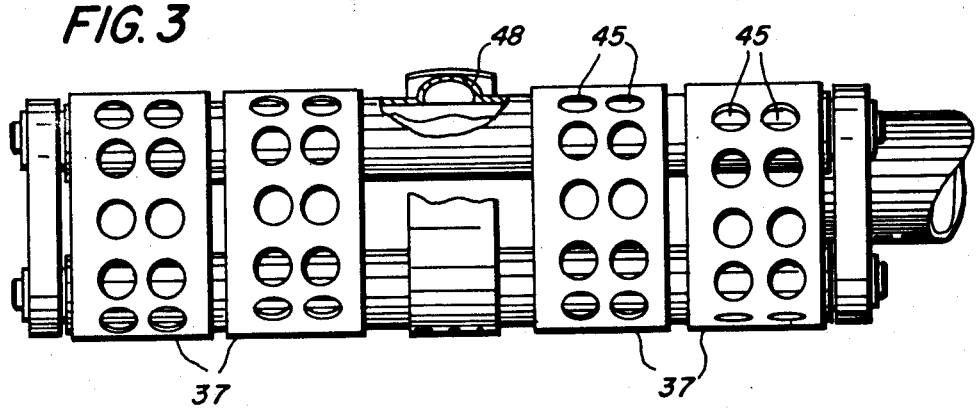
FIG. 3 is an end view, partially in section of the vacuum feed belts illustrated in FIG. 2.
Figure 4:
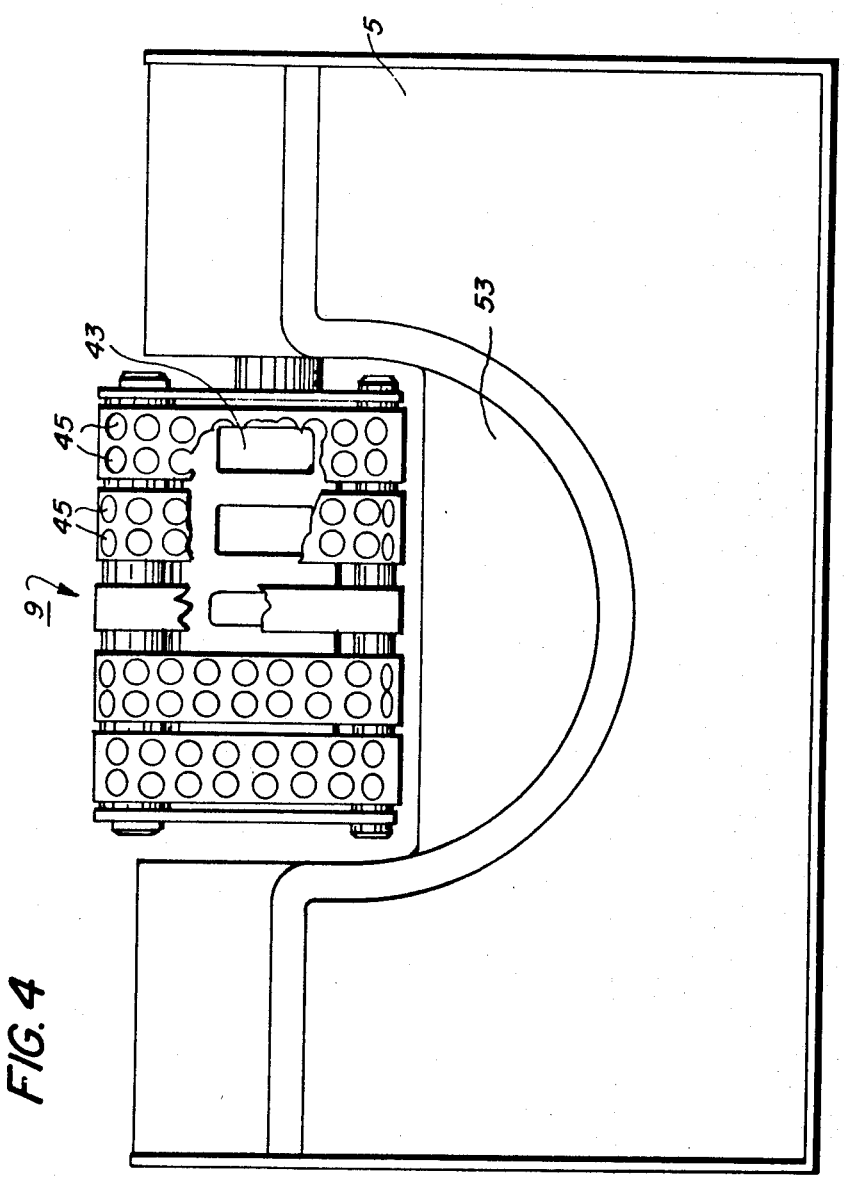
FIG. 4 is a top view of the document tray and feed belts of the document handler illustrated in FIG. 1.

Referring more particularly to FIGS. 2, 3 and 4 wherein the novel document separator-feeder is more clearly illustrated, there is disclosed a plurality of feed belts 37 supported for movement on feed belt rolls 38, 39, and 40. Spaced within the run of the belts 37 there is provided a vacuum plenum 41 having openings 43 therein adapted for cooperation with perforations 45 in the belts 37 to provide a vacuum for pulling the bottom documents in the document stack onto the belts 37. As can be seen from FIG. 3, the plenum is provided with a raised portion 48 beneath the center belt run so that upon capture of the bottom document in the stack against belts 37, a center corrugation will be produced in the bottom sheet. Note also that the belts are below the surrounding support surfaces. Thus the document is corrugated into a double valley configuration. The flat surfaces of the vacuum belts on each side of the raised center belt generates a region of maximum stress in the document which varies with the document beam strength. In the unlikely event that more than one document is pulled down into contact with the feed belts, the beam strength of the second document resists the corrugating action, thus gaps are opened between sheets one and two which extend to their lead edges. These gaps and channels reduce the vacuum levels between sheets one and two due to porosity in sheet one and provide for entry of the separating air flow from the air knife 12. The air knife 12 comprised of pressurized air plenum 50 having a plurality of air jet openings 51 is provided to inject air between the document pulled down against the feed belt and the documents thereabove to provide an air cushion or bearing between the stack and the bottom document to minimize the force necessary for removing the bottom document from the stack. It can be understood that if two documents are pulled down toward the belts 37, since the top sheet would not be corrugated, the air knife would inject air into the space between the two documents and force the second document off from the raised belt back toward the document stack. Control of the height to which the stack is raised by the air pressure under sheet two is provided by openings such as cutaway 52 in the side wall (FIG. 1) and openings in the rear wall (not shown). These openings vent the air under sheet two when the stack is lifted to the height of the openings.

If the document feeder is to be used with large document stacks where the air knife might be insufficient to provide the desired air bearing between the bottom document and the remainder of the stack, supplementary side air jets may be utilized although they have been found to be unnecessary for the conditions normally encountered in current reproduction machines.

While perforated belts cooperating with openings in the vacuum plenum have been disclosed, it may be desireable to use "O" ring type feed belts with the vacuum plenum perforations located between the belt runs rather than beneath the belts. If "O" ring type feed belts are used however, the number of belts must be increased so that the spacing between belts is small enough to prevent the document being drawn down into contact with the vacuum plenum. Additionally the plenum surface should be raised up between the "O" ring belts in the region of the document lead edge. This raised portion is to minimize vacuum air flow under lead edge of the bottom sheet after it has been acquired. This helps prevent multifeeds when the lead edge of the second sheet is further forward then lead edge of the bottom sheet.

By suitable valving and controls, it is desirable to provide a delay between the time the vacuum is applied to pull the document onto the belts and the start up of the feed belts to assure that the bottom document is captured on the belt before belt movement commences and to allow time for the air knife to separate sheet one from any sheets that were pulled down with it.

By reference to FIGS. 1, 2 and 4 it can be seen that the document tray 5 is provided with a depressed portion or pocket 53 having a generally parabolic outline behind the feed belt assembly. This pocket serves a number of purposes. First, space is provided for the forward portion of the bottom document to be pulled down onto the feed belt assembly providing for formation of the two valley corrugation previously mentioned. Secondly, the vacuum is applied over the area of the pocket with an air seal between the bottom document provided by the parabolic edges of the pocket. The air seal maximizes the vacuum force over the whole area of the pocket thus helping to pull the bottom document onto the feed belt assembly. A third function of the parabolic pocket is to provide for a high pressure seal between sheet 1 and the remainder of the stack. This high pressure seal is achieved by supporting a major portion of the stack weight in the edge regions of the pocket. The seal serves to reliably convert the velocity energy of the air knife flow into a lifting pressure over the pocket area.

To further increase the efficiency of the system, the stack tray is provided with a rearward tilt as seen in FIGS. 1 and 2. When floatation air is provided under the stack or between the first and second sheets, gravity will allow the sheets to settle or float back against the rear tray wall. Thus, the sheet being removed is pulled uphill while gravity helps hold the remainder of the sheets back, helping to prevent multifeeds.

With this disclosed arrangement of pocket geometry, air knife and spaced, corrugating feed belt assembly, optimum document separation and feed can be obtained without the necessity for retard members or multiple sheet stops. Further the system is extremely gentle, and since the feed belts are not actuated until the document is firmly captured thereon, there is a minimal slippage between the document and the feed belts and therefore smear or document degradation is practically non-existent.

While I have described a preferred embodiment of my invention, it should be understood that the invention may be otherwise embodied within the scope of the following claims.

What is claimed is:

1. A bottom sheet separator-feeder for separating and forwarding sheets seriatim comprising;
    a stack tray adapted for supporting a stack of sheets to be fed, said tray having a depressed pocket formed therein such that the major portion of the stack weight is supported by the edge portions of said pocket to provide a seal between the sheets and the edge portions of said pocket;
    vacuum feed means disposed beneath said tray adapted to pull the bottom sheet in the stack into said pocket and feed the sheet from beneath the sheet stack; and,
    air injection means disposed adjacent the front of said tray to inject air between the bottom sheet in the stack on said tray and between adjacent sheets in the stack, movement of the bottom sheet in the stack into said pocket by said vacuum feed means causing a pocket shaped depression in the bottom sheet, thereby providing a space between the bottom sheet and the remainder of the stack for receiving air from said air injection means to provide improved air flow over the top of the bottom sheet to support the remainder of the stack spaced from the bottom sheet.

2. A bottom sheet separator according to claim 1 wherein said pocket is generally "U" shaped.

3. A bottom sheet separator-feeder according to claim 1 wherein said air injection means comprises an air knife disposed opposite said pocket to inject air therein.

4. A bottom sheet separator-feeder according to claim 1 wherein said vacuum feed means comprises a plurality of vacuum feed belts, the top surface of said belts being positioned such that when the bottom sheet in the stack is captured thereby, a portion of the sheet is disposed in the pocket to allow passage of air thereover from said air injection means.

* * * * *